(12) United States Patent
Kaito et al.

(10) Patent No.: US 6,864,481 B2
(45) Date of Patent: Mar. 8, 2005

(54) PROBE FOR SCANNING PROBE MICROSCOPE

(75) Inventors: Takashi Kaito, Chiba (JP); Masatoshi Yasutake, Chiba (JP); Tatsuya Adachi, Chiba (JP)

(73) Assignee: SII NanoTechnology Inc., Chiba (JP)

( * ) Notice: Subject to any disclaimer, the term of this patent is extended or adjusted under 35 U.S.C. 154(b) by 0 days.

(21) Appl. No.: 10/308,796

(22) Filed: Dec. 3, 2002

(65) Prior Publication Data

US 2003/0122072 A1 Jul. 3, 2003

(30) Foreign Application Priority Data

Dec. 4, 2001 (JP) ......................................... 2001-370155
Nov. 26, 2002 (JP) ......................................... 2002-342286

(51) Int. Cl.$^7$ ............................ G01N 23/00; G21K 7/00
(52) U.S. Cl. ........................ 250/306; 250/307; 250/309; 250/310; 250/311
(58) Field of Search .................. 73/104, 105; 250/306, 250/307, 309, 310, 311, 398, 492.2; 438/17; 204/192.34

(56) References Cited

U.S. PATENT DOCUMENTS

| | | | | |
|---|---|---|---|---|
| 4,876,112 A | * | 10/1989 | Kaito et al. | 438/674 |
| 5,149,974 A | * | 9/1992 | Kirch et al. | 250/492.2 |
| 5,171,922 A | * | 12/1992 | Anderson | 585/805 |
| 5,171,992 A | * | 12/1992 | Clabes et al. | 250/306 |
| 5,393,985 A | * | 2/1995 | Yamakage et al. | 250/398 |
| 5,440,122 A | * | 8/1995 | Yasutake | 250/443.1 |
| 5,611,942 A | * | 3/1997 | Mitsui et al. | 216/67 |
| 5,763,879 A | * | 6/1998 | Zimmer et al. | 250/306 |
| 6,146,227 A | * | 11/2000 | Mancevski | 445/24 |
| 6,214,178 B1 | * | 4/2001 | Chakrabarti et al. | 204/192.34 |
| 6,300,631 B1 | * | 10/2001 | Shofner | 250/311 |
| 6,403,388 B1 | * | 6/2002 | Birdsley et al. | 438/17 |
| 6,597,090 B1 | * | 7/2003 | Mancevski | 313/309 |

* cited by examiner

Primary Examiner—Frank G. Font
Assistant Examiner—Mary El-Shammaa
(74) Attorney, Agent, or Firm—Adams & Wilks

(57) ABSTRACT

A probe for a scanning probe microscope has a cantilever portion and a microscopic probe portion formed of a solid columnar tip at a distal end of the cantilever portion by deposition using an organic gas decomposed by a focused ion beam inside a vacuum chamber. The probe is sufficiently narrow and has high abrasion resistance and rigidity. The tip may be grown to extend from the cantilever portion at an angle shifted by an angle at which the cantilever portion is inclined during scanning of the probe portion across a sample surface, so that the columnar tip is perpendicular to the sample surface during the scanning. The tip may be formed of a conductive material such as tungsten of diamond-like carbon by FIB-CVD.

22 Claims, 7 Drawing Sheets

CONVENTIONAL FORMATION

IDEAL FORMATION

OBSERVATION IMAGES FROM DIAGONALLY ABOVE a b c d e f g

OBSERVATION IMAGES FROM ABOVE

θ = 34°

SILICON NEEDLE

| Probe material | Processing time | length | Tip end/ blade size | Taper angle (single side angle) |
|---|---|---|---|---|
| C + W | 45 seconds | 1.00 μm | 113nm/127nm | 0.8° (0.4°) |
| C | 45 seconds | 1.01 μm | 117nm/129nm | 0.69° (0.35°) |
| W | 102 seconds | 1.39 μm | 113nm/285nm | 7.0° (3.5°) |
| With trimming | 240 seconds | 1.55 μm | 65nm/170nm | 3.88° (1.9°) |
| Si | | | | 34° (17°) |
| C: EV-CVD | | 1.00 μm | 38nm/75nm | 2.1° (1.1°) |

FIG. 11

| sample | Gas type | Process time | Gun distance | Tip/blade size | length | remarks |
|---|---|---|---|---|---|---|
| a | A+B | 45 seconds | 351 μm | 100nm/175nm | 1.00 μm | 0.2 μm trimming |
| b | B | 45 seconds | 351 μm | 94nm/164nm | 1.01 μm | |
| c | A | 45 seconds | 351 μm | 174nm/210nm | 0.342 μm | |
| d | B | 45 seconds | 351 μm | 102nm/174nm | 1.08 μm | |
| e | A | 45 seconds | 201 μm | 95nm/235nm | 0.42 μm | Center size 155 μm |
| f | A | 45 seconds | 101 μm | 107nm/244nm | 0.55 μm | 0.06μm trimming |
| g | A | 120 seconds | 101 μm | 87nm/300nm | 1.39 μm | 0.2 μm trimming | great# PROBE FOR SCANNING PROBE MICROSCOPE

BACKGROUND OF THE INVENTION

The present invention relates to a probe structure for a scanning probe microscope.

Conventionally, a probe for the end of a cantilever of an atomic force microscope (AFM) has silicon or silicon nitride as a base material and the cantilever section is made using microfabrication technology such as lithography or etching. In particular, a tip of the probe is required to be made with a pointed tip as a probe for an atomic force microscope. As a specific manufacturing method, oxidation is performed. Thereafter, an oxide film is removed by etching and sharpening is carried out. In this case, the shape of a needle point is conical (pyramid shaped due to the crystal state) as shown in FIG. 4. (O. Wolter, Th Bayer, J. Greschner: "Micromachined silicon sensors for Scanning Force Microscopy" J. Vac. Sci. Technol. B9 (2), Mar./Apr. 1353–1357 (1991)).

As another probe for an AFM, there has also been proposed a deposition tip formed by irradiating an electron beam to a cantilever tip inside a vacuum chamber of a scanning electron microscope, and depositing carbon products on the irradiated section using an electron beam. A cylindrical tip can be formed, but it is weak against impact and has insufficient strength for use as an AFM tip.

Experiments have also been carried out using a multi-wall carbon nanotube as an AFM probe, which is formed of multiple tubes in which one to a few tens of layers of graphite type carbon are accumulated. However, in addition to the fact that processing to attach this carbon nanotube to the tip of an AFM cantilever is difficult, even if this is attached well, rigidity is low, which means that it is unsuitable for fixing to a side wall and to measurement of a stepped sample.

A cantilever probe of the above described silicon nitride or silicon material has a probe tip formed into a pointed cone (pyramid) as shown in FIG. 4, and this means that each time the probe is brought into contact with a sample in order to acquire an image there is abrasion by the probe tip, and variation in the probe tip diameter. Since image resolution of a probe microscope is basically determined by tip diameter, these images suffer from deteriorated resolution during measurement. Also, since it is not possible to detect the variation of the tip diameter due to abrasion, it is not possible to obtain reproducibility in measurement, and LSI line width and precision are insufficient. A conventional probe is formed perpendicular to the cantilever surface 6, as shown in FIG. 1A, and, when scanning, the cantilever is in contact with and inclined upwards from the sample surface, which means that the probe contact angle is not perpendicular with respect to the sample surface. For this reason, a side wall angle is not correctly measured, and measurement of a vertically rising side wall is difficult. In this regard, the ideal probe direction is perpendicular with respect to the sample surface, as shown in FIG. 1B. A probe of the related art has a surface coated with a metallic film in order to give it conductivity, but since it is easy for the metallic film to become peeled off during scanning for image measurement, the metallic film is coated more thickly and there is a problem that the probe tip diameter is increased and image resolution is lowered.

SUMMARY OF THE INVENTION

An object of the present invention is to provide a probe for a scanning probe microscope having high mechanical abrasion resistance and required rigidity, formed attached to the tip of a cantilever so that the tip is perpendicular with respect to a sample surface, and having a material that is conductive so that measurement reproducibility is good with stable resolution.

A probe for a probe microscope of the present invention has a solid cylindrical tip of a conductive material such as tungsten or diamond-like carbon (DLC) formed on a tip section of a cantilever by chemical vapor deposition (CVD) using a focused ion beam (FIB), the probe being formed growing in a direction perpendicular to the sample surface at the time of scanning, and the shape of the probe tip section is formed so as to be substantially spherical.

Also, in the case of a probe microscope for detecting quantity of electricity, in order to pick up an electrical signal, conductive metal is coated on a silicon or silicon nitride cantilever, and a cylindrical tip is grown by FIB-CVD with a foundation formed by widely flattening an area of a tip section of a conventional silicon probe as a base, so as to reinforce blade strength.

As an applied example, by having a structure with a plurality of cylindrical tips of differing length erected on the same cantilever, two tips, with an angle between cylindrical tips already known, are formed on a tip section of the cantilever so that even if a first probe is damaged it is possible to carry out measurement using a next probe, enabling measurement of a side wall of a sample. In order to give the cantilever probe rigidity, the periphery is reinforced using FIB-CVD.

BRIEF DESCRIPTION OF THE DRAWINGS

FIG. 10 is a table showing protuberances formed by present invention process and related art.

FIG. 11 is a table showing any cylindrical tips formed by the present invention process.

BRIEF DESCRIPTION OF THE INVENTION

The present invention is intended to solve the disadvantages of a scanning probe microscope probe of the related art, and proposes a probe structure using technology (Japanese patent application No. 2002-363573) for creating a novel ultrafine solid structure (nanostructure) by chemical vapor deposition using a focused ion beam (FIB-CVD). Specifically, a columnar rigid protuberance is formed on a ready-made scanning probe needle, for example a silicon nitride needle, using an FIB-CVD method. Tungsten or DLC used in FIB-CVD is used as a material for this protuberance. The FIB-CVD method used here to make an ultrafine solid structure is characterized by the fact that gas spray concentration is five to ten times higher than a conventional FIB-CVD method. These materials are confirmed to be harder and more rigid than silicon. Also, with a process used in the FIB-CVD method, it is possible to form a probe having extremely high attachment strength to a base plate due to mixing by an ion beam.

It is also simple to determine the place where a protuberance is grown using this FIB-CVD method, and to control the shape and dimensions of the formed protuberance. It is possible to make the growth direction of the protuberance vertical with respect to the irradiation direction of the ion beam, and it is possible to form any three dimensional shape in cooperation with drive of a sample stage. Accordingly, if this technique is used it becomes possible to simply make a probe in a desired shape. Being able to obtain probe contact in a vertical direction with respect to the sample surface is extremely important in measuring CD (critical dimension).

Processing can also be carried out in a comparatively short time. For example, the time taken to grow a tungsten protuberance of height 1 $\mu$m and diameter 80 nm is about 100 seconds. With an FIB device installed with the latest software, it is possible to make a scanning probe needle for measurement at a high aspect ratio of 100 or more in a short time by continuous and automatic processing of a silicon cantilever array (wafer) before being individually separated. It is also possible to form tips of longer than 2000 $\mu$m in length or probes of 100 nm or more in thickness, and which opens up new fields to measurement using scanning optical microscopes.

A specific formation sequence will be described in the following.

Step 1.

A silicon cantilever array (or an individual cantilever) is attached to a sample platform of an FIB device up to a ready-made scanning probe, for example, up to a probe section, and placed inside a vacuum chamber.

Step 2.

Figure 2A:
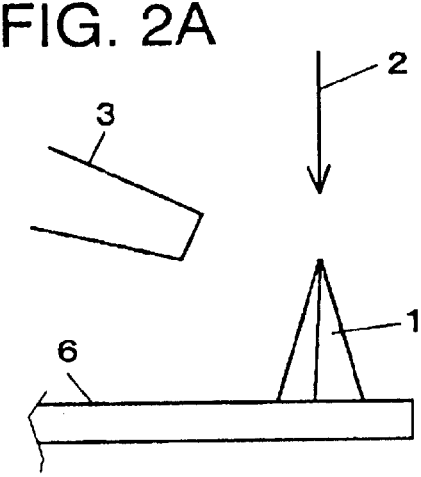
FIGS. 2A–2F are drawings for describing a processing step of a probe tip section of the present invention.

A place where a protuberance is to be formed is specified using a scanning ion microscope function etc. As shown in FIG. 2A, the sample (probe) is positioned so as to be irradiated with a focused ion beam at a tip section of the probe 1. Reference numeral 3 in the drawings is a gas gun, and sprays source material gas to the sample surface.

Step 3.

Figure 2B:
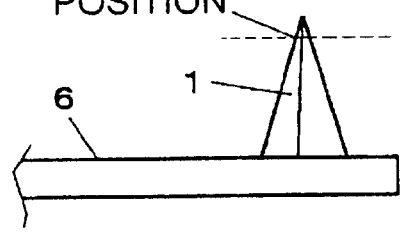
Figure 2C:
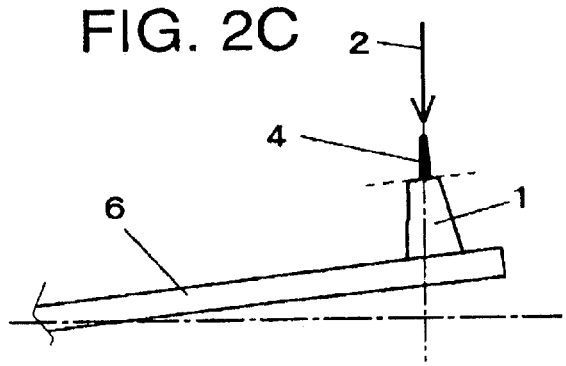
Figure 2D:
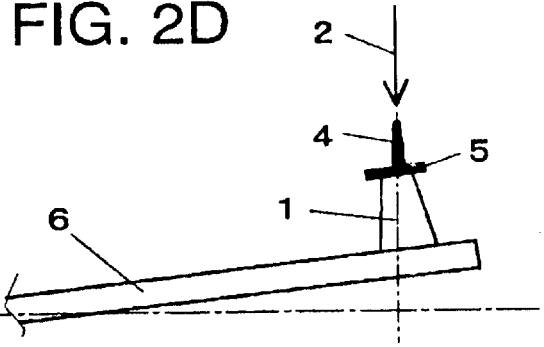

As required, a substrate side (silicon protuberance tip section) for carrying out protuberance formation is smoothed as a base before formation of the protuberance using an FIB-CVD method. It is also possible to carry out deposition directly onto the silicon protuberance tip section and form a columnar tip, but in order to give a blade section mechanical strength it is preferable to carry out deposition on a flat surface and to form a columnar tip. The sample stage is turned through 90 degrees and the focused ion beam is irradiated from the side to remove a tip section shown by the dotted line in FIG. 2B by sputtering to form a flat section. The level section preferably forms a foundation 5 using a FTB-CVD method, as shown in FIG. 2D. In this case an ion beam 2 carries out deposition not with spot irradiation but by scanning, but it is also possible to form a wide flat section.

Step 4.

Figure 1A:
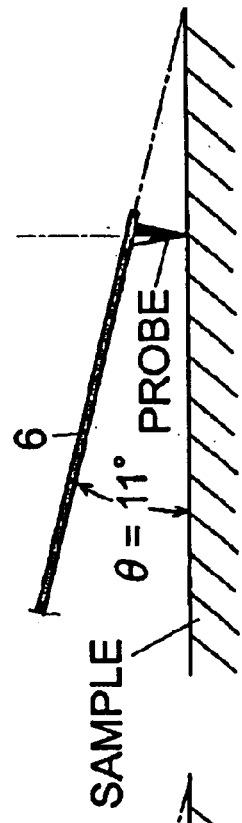
FIGS. 1A and 1B are drawings for describing a relationship between cantilever inclination angle of a scanning probe microscope and contact angle of a probe with respect to a sample surface.
Figure 1B:
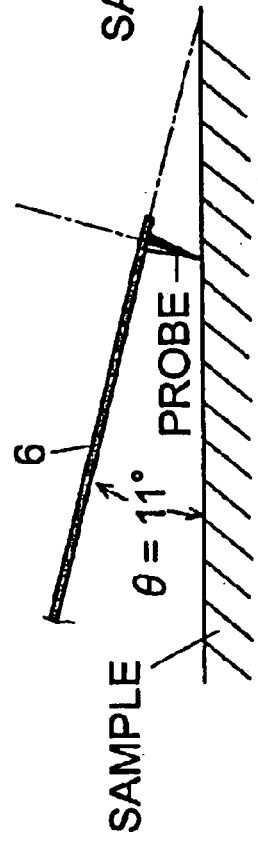

A protuberance is grown using an FIB-CVD method. Beam current when causing growth with a spot beam is in the order of 0.3–1 pA. FIG. 2C shows formation of a columnar tip 4 on a level section cut into the tip section, and FIG. 2D shows formation of a columnar tip 4 on a level section after first of all forming a foundation on the tip section. The sample stage is tilted so as to irradiate the ion beam from a perpendicular direction to any level section. In this way, it is possible to form into the ideal shape shown in FIG. 1B by growing a columnar tip with the ion beam direction remaining fixed. It is also possible with this FIB-CVD method to form a columnar tip of a desired angle by gradually shifting the ion beam direction without inclining the stage, but control becomes troublesome and so the previous method is preferable.

Figure 2E:
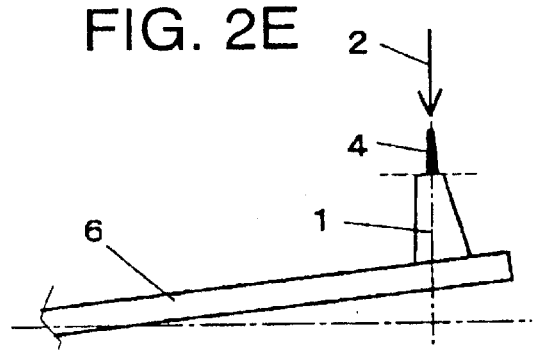
Figure 2F:
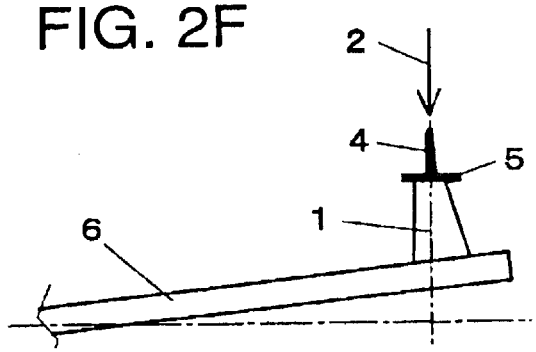

The level section cut into the tip section or a base section formed so as to be parallel a sample surface like shown FIGS. 2E, 2F and a columnar tip formed vertically on the level section by the deposition, thereby the columnar tip is fixed more strongly.

If tungsten is selected as material for the protuberance, tungsten hexacarbonyl: $W(CO)_6$ is used as the material gas. If spraying is carried out at a gas pressure, of $3 \times 10^{-3}$ Pa, which is measurement amount of a vacuum gauge of FIB sample chamber fixed far from a nozzle, growth rate of the protuberance height is 10 nm/second. If diamond-like carbon (DLC) is selected as the material of the protuberance, a hydrocarbon gas, for example, phenanthrene gas: $C_{14}H_{10}$, is used as the material gas. Growth rate of the protuberance height can be up to 100 nm/second, but for harder output the growth rate is made 10 nm/second. Growth rate is controlled by gas supply amount (gas pressure is x $10^{-5}$–$10^{-6}$ Pa).

Also, if a magnetic protuberance is formed, a material gas such as tetra nickel carbonyl $Ni(CO)_4$, dicobalt octacarbonyl $Co_2(CO)_8$, nickelocene $Ni(C_5H_5)_2$ cobaltocene $Co(C_5H_5)_2$, or ferrocene $Fe(C_5H_5)_2$, is used as a material gas, a growth rate is similarly controlled using gas supply amount (gas pressure is x $10^{-3}$~$10^{-6}$ Pa).

It is also possible to form a probe, by splicing a metallic cylindrical tip using a metallic gas as organic gas, on a tip having a carbon solid cylindrical tip formed using hydrocarbon gas as organic gas. Since this type of probe can allow metal of desired characteristics to exist only at the tip section of the probe, as a probe for a scanning probe microscope it has good sensitivity to local information, namely, it can provide a high resolution probe.

Step 5.

As required, after forming a protuberance using an FIB-CVD method, smoothing is carried out by subjecting the protuberance itself to sputter etching using a focused ion beam. This protuberance formation using a FIB-CVD method can sometimes have an uneven shape that is not perfectly columnar, depending on the material, for example, in the case of causing tungsten formation using tungsten hexacarbonyl, an irregular shaped thin wavy film is formed at the circumference. This section can be easily scraped off by sputtering. Formation of this protuberance using an FIB-CVD method enables a thin-plate shaped growth formation using a line scanning beam, as well as columnar shaped growth formation using a spot beam where the beam irradiation position has been stopped. It is also possible to process the shape of the protuberance tip to various shapes as required using the FIB-CVD method and milling.

With the present invention, the end section of a cylindrical tip is shaped so as to be hemispherical. This is to bring about the following advantages. Specifically:

1. Since the needle tip is hemispherical, it is easy to derive (deconvolution) contact positions for the tip section with respect to unevenness of the sample surface, which means that it is easy to correct lack of clarity in a measurement image,
2. When a needle tip has been made hemispherical, if contact pressure is controlled to be constant, a contact surface area with respect to the sample surface is made stable so as to hold a constant value, and reproducibility of conductivity measurement is increased.
3. When a needle tip has been made hemispherical, at the time of pressing against the sample surface and scanning it is possible to exert a desired pressure on the tip section surface area because the sample surface is unlikely to be damaged. If the method of forming the tip section of this cylindrical tip so as to be hemispherical is implemented using the FIB-CVD method of the present invention, it is almost possible to form this shape, but smoothing is carried out by sputtering, as required.

Next, an experimental example of formation of a protuberance of the present invention using an FIB-CVD method will be presented.

Deposition was carried out for four minutes using $W(CO)_6$ of 65/86° C. (the former representing reserve temperature, the latter representing temperature of a nozzle section) and spraying at a gas pressure of $3\times10^{-3}$ Pa. A columnar tip is formed having a tapered shape with a blade diameter of 470 nm/ø, a tip diameter of 90 nm/ø and a height of 2.6 µm. The blade side was made thicker without making it into a columnar shape by CVD using this $W(CO)_6$ with a growth rate of 0.65 µm/minute. Formation is also such that a thin wavy film is fixed to the periphery of the column itself. As a probe for a scanning probe microscope, it is preferable that the tip section does not vary due to abrasion, and it is preferable to form a columnar tip that is not tapered. A probe for measuring electrical characteristics (current, voltage, resistance, capacitance) of a sample is required to be conductive, and a probe facing the sample must also be of a conductive material. Carbon also has suitable conductivity, besides metals such as tungsten and Ruthenium, but specific resistance is different. In the case of carbon, structural formation using deposition has a fast growth rate, and processing is simple, while on the other hand from a conductivity point of view it cannot compare with metal. Therefore, with the present invention, formation of a tip made from a mixed material of tungsten and carbon has been conceived, by CVD using $W(CO)_6$ and phenanthrene ($C_{14}H_{10}$) as source material gasses. Two gas guns are arranged facing the sample, and deposition is performed while spraying them both at the same time. There are also methods for spraying a mixed gas from a single gas gun, but the former method is superior in that it is possible to spray each source material gas at its optimum temperature.

A comparison was made between three types of tip, namely a mixed tip of carbon and tungsten formed by simultaneously spraying $W(CO)_6$ from one gas gun and spraying $C_{14}H_{10}$ from another gas gun, and a carbon tip or a tungsten tip formed by spaying only one of these, and a conventional silicon probe and a carbon tip formed using CVD where an electron beam is irradiated, there being two cases for the tungsten tip, namely a tungsten tip formed with trimming carried out and a tungsten tip formed with trimming not carried out. The mixed carbon and tungsten tip was formed with a length of 1.00 µm×thickness (tip diameter 113 nmø, blade size 127 nmø) by deposition for 45 seconds. Taper is 0.8° (single side angle 0.4°). The carbon tip was similarly formed with a length of 1.01 µm×thickness (tip diameter 117 nmø, blade size 129 nmø) by deposition for 45 seconds. Taper is 0.69° (single side angle 0.35°). The tungsten tip was formed with a length of 1.39 µm×thickness (tip diameter 113 nmø, blade size 285 nmø) by deposition for 120 seconds. Taper is large at 7° (single side angle 3.5°). Trimming was performed by sputtering to shave a side surface, and after adopting a method of applying processing to reduce taper angle and performing deposition in order to enlarge a part removed by sputtering, trimming is performed. A tip was formed with a length of 1.55 µm×thickness (tip diameter 65 nmø, blade size 170 nmø) and taper was formed to 3.88° (single side angle 1.9°). Processing time was 240 seconds. Results are shown in FIG. 10.

Next, comparison will be presented of example formation for seven types of cylindrical tip in FIG. 11. $W(CO)_6$ was sprayed from gas gun A as a material gas, and $C_{14}H_{10}$ was sprayed to gas gun B. Since material gas concentration has a large influence on deposition, as well as gas pressure, distance between other nozzles is also important data.

Figure 3:
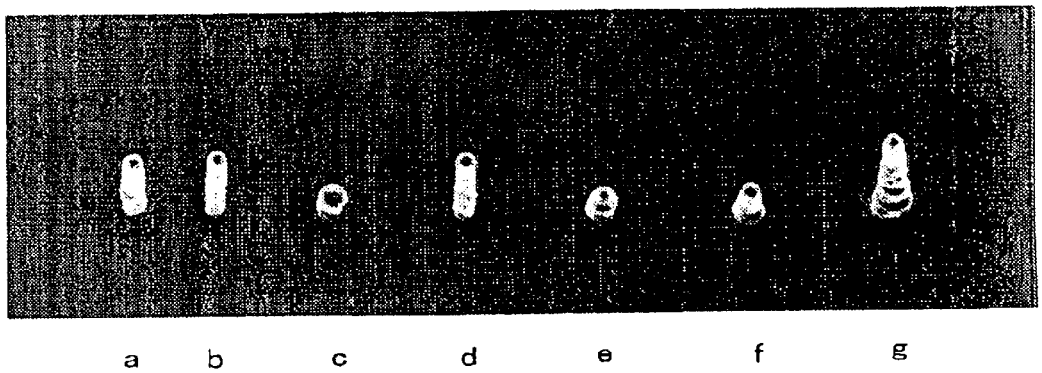
FIG. 3 shows observation images taken using a scanning ion microscope of cylindrical tips made under different conditions.
Figure 3:
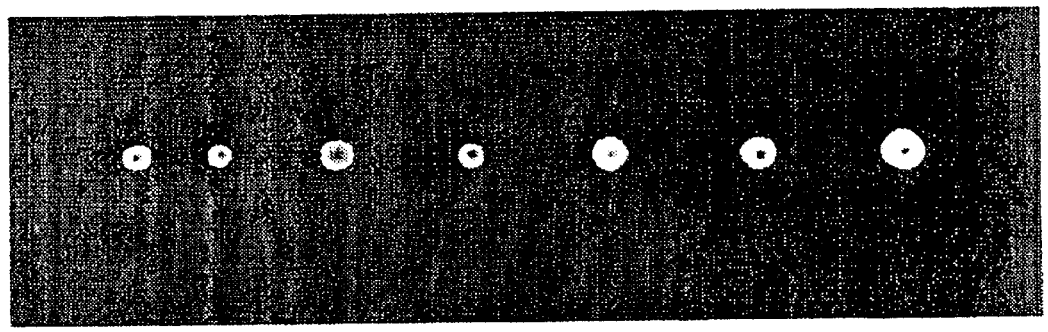
Figure 4:
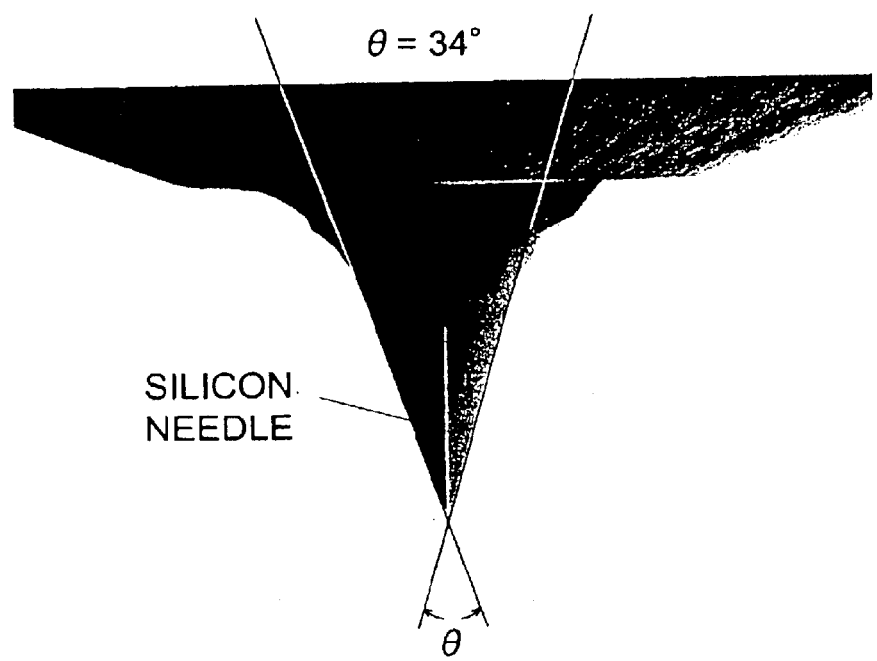
FIG. 4 shows observation images of a conventional silicon probe taken using a scanning ion microscope.

In samples a, f and g, a thin wavy film was formed, and so trimming was carried out using ion bean irradiation from above. With a length of 0.2 µm sample f had 0.06 µm shaved off and sample g had 0.2 µm shaved off. FIG. 3 shows this sample observed using an ion beam microscope. The upper picture shows observation images looking from diagonally below, while the lower picture shows observation images from above.

Embodiment

An embodiment will be shown of a processing a tip section of a silicon probe of a conventional probe microscope to form a columnar tip having a mixture of tungsten and carbon.

Step 1. Foundation Formation

A probe microscope silicon probe was mounted on a sample stage of an FIB device, the sample stage is placed in a perpendicular direction with respect to the ion beam direction, CVD is performed for 88 seconds with $W(CO)_6$ sprayed from one gas gun with a reserve and nozzle temperatures set to 60° C. and 85° C. respectively and $C_{14}H_{10}$ sprayed from another gas gun with reserve and nozzle temperatures; similarly respectively set to 70° C. and 73° C., and a foundation of 0.2 µm in every direction and thickness of 0.09 µm was formed with an FIB-CVD method with high gas spraying density, since growth is possible up to a direction perpendicular with respect to the beam direction, by scanning the beam from the upper region it is possible to form a foundation that is wider than the width of the probe tip section.

Step 2. Formation of Columnar Tip

Sample stage inclination is set to 11°, which is the inclination angle at the time of probe scanning, and positioned so that the beam irradiation position is at the center of the foundation. Maintaining a condition where a focused ion beam spot position is fixed at the center of the foundation, FIB-CVD is performed for 30 seconds with $W(CO)_6$ and $C_{14}H_{10}$ sprayed from gas guns, and a columnar tip with a blade section diameter of 0.18 µmø and a tapered shape of a tip section of 0.08 µmø was formed. The axial direction of the columnar tip at this time becomes 90°−11°=79° with respect to the cantilever surface, and the probe is set at an angle to contact the sample perpendicularly during probe scanning.

Step 3. Trimming to Adjust Shape

The columnar tip formed at this time has a wavy film around the edge, and a taper angle is large which means that the sample stage is not perpendicular with respect to the beam direction but inclined slightly, and trimming to adjust the shape is carried out by beam irradiation from above. The shape adjusted columnar tip has a height of 1.20 µm, blade diameter of 120 nmø and tip diameter of 60 nmø, and the tip shape was a hemisphere of 30 nm R.

Figure 5:
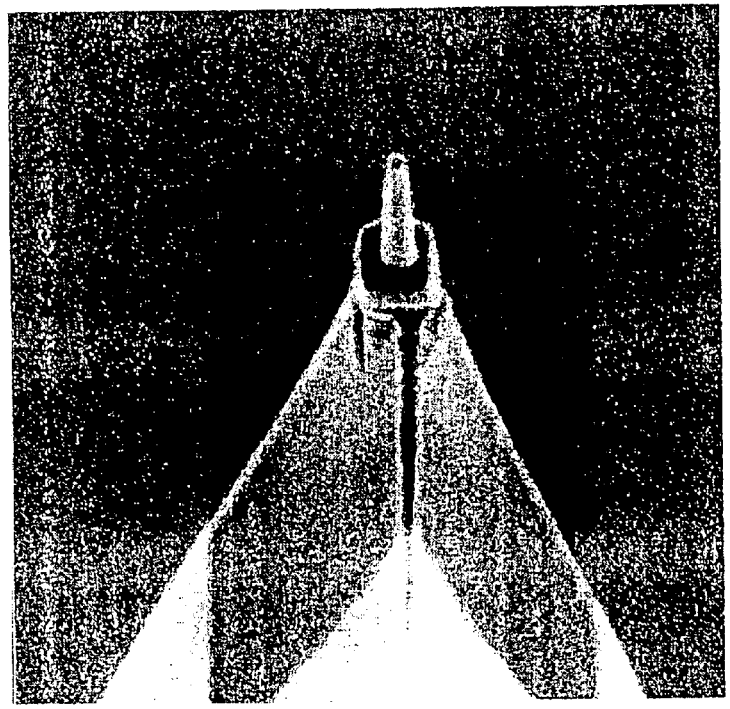
FIG. 5 shows observation images of a probe tip section of a first embodiment of the present invention taken using a scanning ion microscope.

FIG. 5 is this embodiment photographed with an ion microscope. A foundation is formed on the tip of a silicon probe point section, and it is possible to observe a tungsten and carbon columnar tip erected on that foundation in a direction of 79°. From this observed image, it can be seen that in the case of tungsten deposition the tip is not completely columnar like the lead of a propelling pencil, buy that a taper angle arises. However, if growth is caused to further increase length, thickness gradually becomes uniform With the above described method, a tungsten and carbon cylindrical tip is formed erected in a direction of 79°, but there is a problem that adhesion of the cylindrical tip is slightly brittle due to the fact that a surface of a foundation section constituting a base of this cylindrical tip is not a surface orthogonal to the cylindrical axis. A manufacturing method that can ensure solid adhesion to solve this problem is shown in the following.

300–400 silicon cantilevers constituting a processing base are formed arranged at equal intervals in an oblong shape on a normal 4 inch wafer. Accordingly, continuous processing is performed inside a focused ion beam chamber having an XY stage capable of precise movement and an β stage for compensating setting angle. A specific manufacturing sequence is as described in the following.

Step 1.

A cantilever that has already been formed on a wafer is attached to a sample stage of an FIB device and placed in a vacuum chamber.

Step 2.

Similarly to as described above, a place where a protuberance is to be formed is specified using a scanning ion microscope function or the like. A plurality of previously processed cantilever probe tips are observed and their XY coordinates are registered. Even if the stage moves, the stage is moved so that a distance from a gas gun nozzle to individual probe tips being processed does not change.

Step 3.

The wafer is inclined on the θ stage and the probe tip is cut by an ion beam to form a flat section. Alternatively, in the event that the tip is flat from the start and a conductive probe is formed using a probe having a surface angle set so as to be parallel to a measurement sample surface formed on a wafer, metal (for example gold or platinum) is sputter coated before placement in the chamber.

The θ stage is tilted by an amount to compensate for a cantilever setting angle, material gas is sprayed using a gas gun and a substrate side (silicon projecting tip end section) for carrying out protuberance formation is smoothed to make a foundation. This is in order to obtain mechanical strength for the blade section, and to get conduction with the conductive coating material of the lower section. In this case, as described previously deposition is carried out while scanning the ion beam and not spot irradiation, but it is possible to form a wide flat section.

In the case of a conductive cantilever, ion beam current flowing in the wafer at the time of forming the foundation is measured with a high sensitivity ammeter, a conduction state between the foundation and the probe is confirmed and a cantilever that is not conductive is screened out as a defective product.

Step 4.

As described previously, a protuberance is grown by an FIB-CVD method. Beam current when causing growth with a spot beam is in the order of 0.3–1 pA. Growth rate is controlled by gas supply amount (gas pressure also depends on the type of gas but is $\times 10^{-3}$–$10^{-6}$ Pa), optimum conditions are sought and length of a column (probe) is normally controlled by controlling ion beam irradiation time. Alternatively, in the case of a conductive cantilever, ion beam current flowing in the wafer at the time of column (probe) formation is measured using a high sensitivity ammeter, a conduction state of the probe is confirmed and the position of a non-conducting probe is specified and screened out as a defective product. It is also possible to accumulate ion beam current flowing in control of growth length and to stop ion beam irradiation when it becomes a constant charge amount.

Step 5.

Similarly to as previously described, as required adjustment is carried by further sputter etching processing using a focused ion beam on the formed protuberance itself after forming the protuberance using an FIB-CVD method.

Step 6.

The wafer is tilted on the e stage and the length of the grown column (probe) measured using an SIM. Alternatively, in the case of a dual beam device having an electron beam column, the grown column length is measured using an SEN image.

Step 7.

Next, the position of the cantilever is moved a processing returns to steps 2–6.

The above described method has been represented with a sequence of forming one cantilever at a single place per processing sequence, but it is also possible to have a method where a plurality of cantilevers are formed with the same processing without varying the position In this case there is no need for changes in focused ion beam settings or stage inclination, which brings about a reduced formation time.

Next, applied examples of the present invention will be presented.

"Forked Probe for Side Wall Measurement"

Figure 6A:
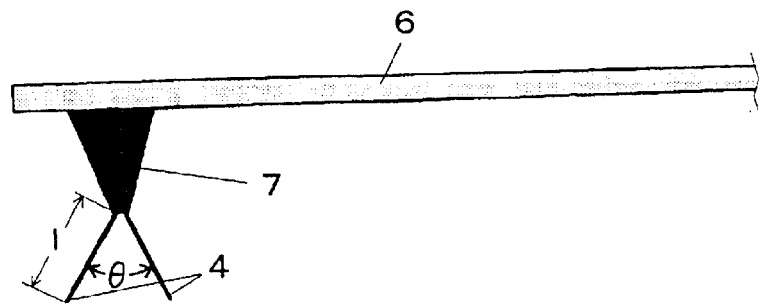
FIGS. 6A–6C are drawings for describing a forked probe for side wall measurement, being an applied example of the present invention.
Figures 6B, 6C:
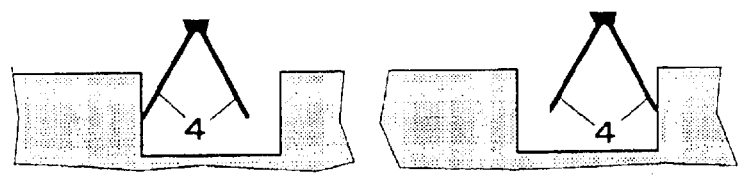

Using a bifurcated probe as shown in FIG. 6A, a probe for measuring a side wall of an indentation such as a groove in a sample is formed using the deposition technique of the present invention. The probe tip section has two cylindrical tips 4 of constant length 1 from a base tip section 7 as shown in the drawing, and an angle Θ between the two cylindrical tips is already known. Since it is possible using this bifurcated probe for one of the cylindrical tips to achieve tip contact with a vertical side wall, as shown in FIG. 6b and FIG. 6c, it is possible to perform CD measurement which was difficult with a conventional probe microscope. The number of cylindrical tips does not need to be two and can be any number greater than 2 as long as the length and angle of each tip with respect to the base tip section are known.

"Bell-Shaped Probe for Side Wall Measurement"

Figure 7:
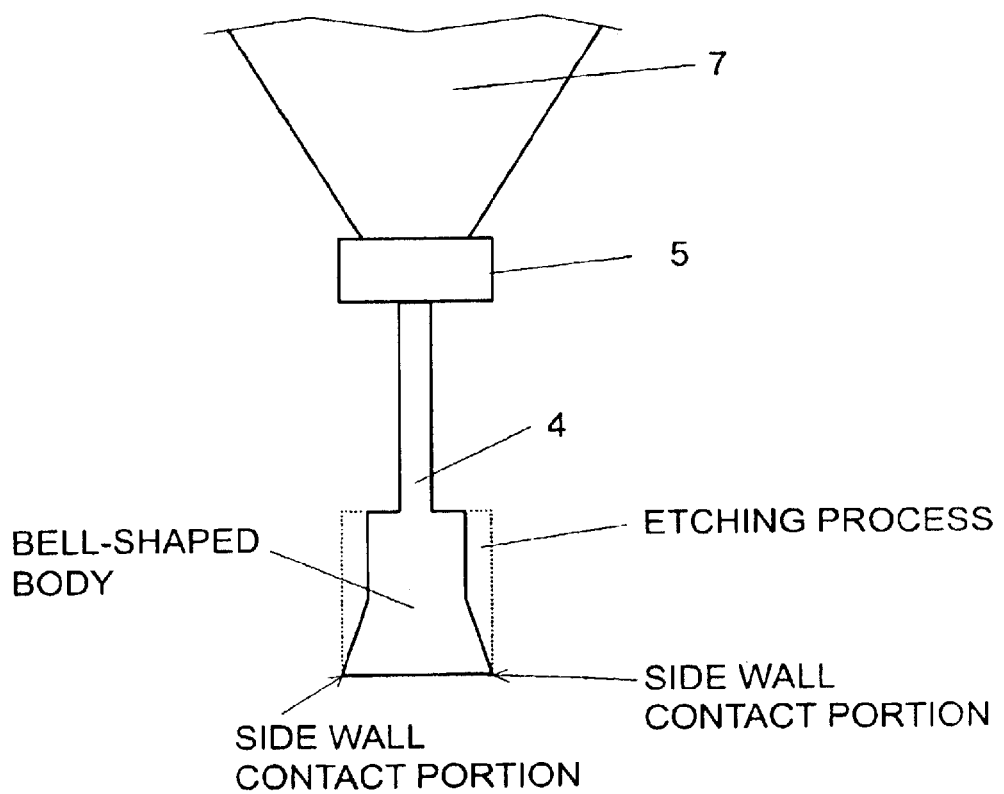
FIG. 7 is a drawing for describing a bell-shape probe for side wall measurement, being an applied example of the present invention.

Besides the above described forked probes, there has also been suggested a probe for side wall measurement with a tip formed into a bell shape and both end sections of the tip sharpened. As shown in FIG. 7, a tip section of a silicon probe is cut and deposition carried-out on that foundation, and a cylindrical body is formed by deposition with that foundation as a base. Side surface sections of this cylindrical body are shaved oft using FIB etching, as shown in the drawing, to sharpen tip fringe sections and form a bell shape. This sharpened tip fringe section contacts side walls of a groove to carry out a probe function. The structure shown in the drawing is formed such that the cylindrical body is spliced between the foundation and the bell-shaped body, but as required it is possible to make it longer if a groove or hole to be measured is deep. As a processing method, it is possible to form a thick probe by varying irradiation conditions of an ion beam during formation of the cylindrical body probe using deposition, then to further vary the ion beam irradiation conditions to cut off a tip end using an ultra fine ion beam, then shave off a side surface at a slant to form a pointed protuberance for measurement of side walls on the tip fringe section.

"Probe Provided with Multiple Cylindrical Tips"

Figure 8A:
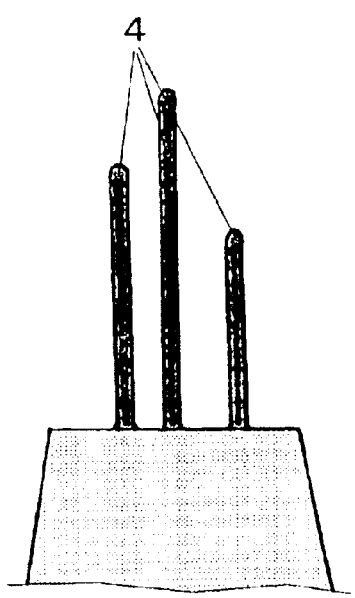
FIG. 8A is a drawing for describing a probe provided with a plurality of cylindrical tips, being an applied example of the present invention.

As shown in FIG. 8A, this probe is constructed having a plurality of cylindrical tips of differing length erected on the same cantilever. By having this type of structure, even if a first probe, which is the longest, is damaged, it is possible to carry out measurement using a next probe. Not only does this make it possible to prolong the lifespan of the probe, but it is also possible to carry out continuous measurement without any change or replacement, even if the probe is damaged by being broken off during measurement. Opening a vacuum chamber, replacing the probe and readjusting measurement conditions takes a lot of time and effort, so this applied example is very effective.

"Probe having a Cylindrical Tip made Partially Thin"

Figure 8B:
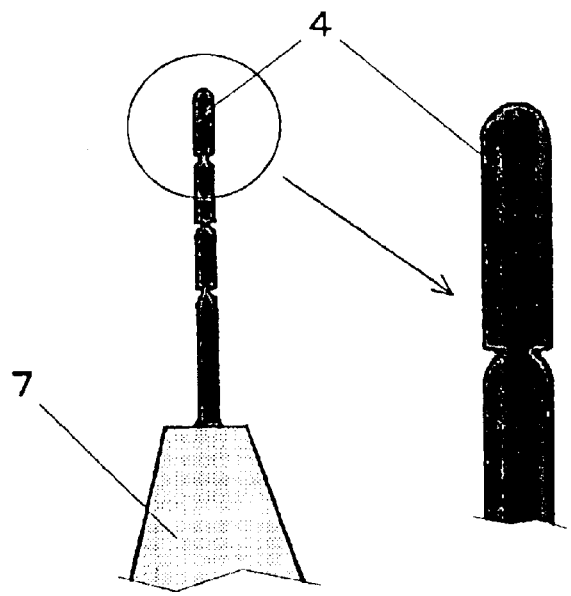
FIG. 8B is a drawing for describing a probe having a cylindrical tip that is partially thinned, being an applied example of the present invention.

As shown in FIG. 8B, the probe has a structure where thickness of the cylindrical tip becomes thin in parts. By having this structure, it is easy for the probe to mechanically break at the location where the diameter is tapered. In cases such as where the tip section being disadvantageously transformed during measurement or foreign bodies are attached, it is possible to deliberately apply a load, break of the tip and use the next section as the tip section. Similarly to the previous example, it is possible to continue measurement without opening a vacuum chamber and replacing the probe.

"Probe given Rigidity Using CNT"

Figure 9:
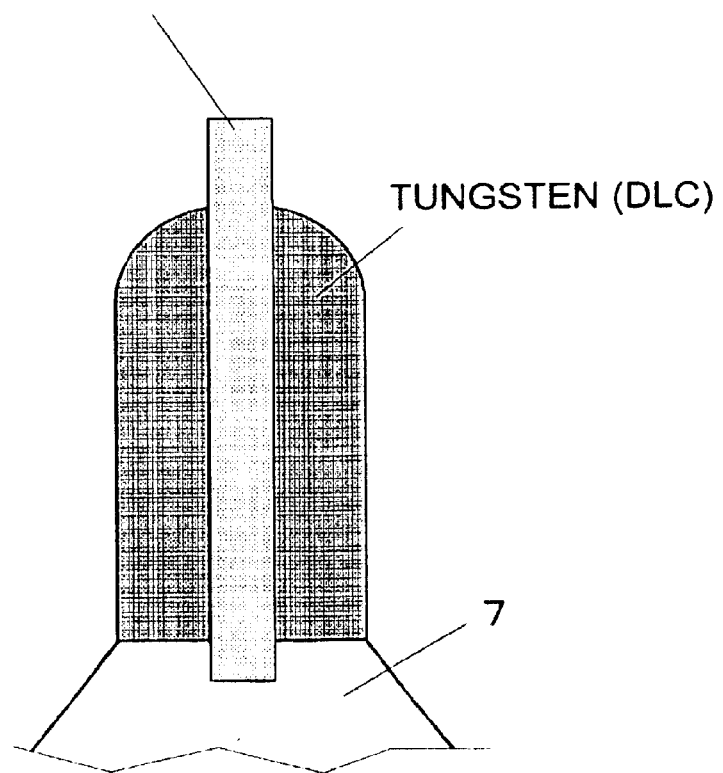
FIG. 9 is a drawing for describing a probe given rigidity by a CNT, being an applied example of the present invention.

There have also been experiments using a carbon nanotube (CNT), being a multi-layer tube where graphite type carbon of two to a few tens of layers that also exists naturally can be overlapped, as an AFM probe, but even if this CNT is attached to the tip of an AFM cantilever, rigidity is low which means that it is not suited to stepped sample measurement. Therefore, the probe as shown in FIG. 9 has been conceived applying the deposition technique of the present invention. Specifically, a probe has a structure where tungsten or DLC is deposited around a narrow cylindrical CNT using the FIB-CVD technique of the present invention. With this deposition, compensation for drawbacks of an F probe using a CNT is achieved.

The probe for a scanning probe microscope of the present invention is formed by causing decomposition of an organic gas through FIB-CVD at a probe tip of a cantilever and forming a columnar tip that is solid and has a very small tip diameter using decomposed DLC or metallic deposits, which means that probe tip diameter varies only slightly due to probe abrasion, and measurement precision of line width and side wall angle is improved The formed columnar tip itself is conductive, and so there is no peeling such as with coating with a metallic film and it is possible to obtain a solid probe having good conductivity.

In the structure where the formed columnar tip itself is conductive, silicon or silicon nitride is used as the cantilever material, and adopting a structure for coating conductive metal is ideal as a scanning probe microscope for measuring electrical information of a sample.

It is also possible for a formed cylindrical tip that is magnetic to detect localized information with high sensitivity as a probe for a scanning probe microscope for measuring magnetic information of a sample, and to provide a probe that does not suffer from peeling problems and is mechanically stable.

A probe for a scanning probe microscope formed by splicing a metallic cylindrical tip at a tip end formed of a carbon solid cylindrical tip is capable of allowing metal of desired characteristics to exist only at sections where a sample is contacted, so it is suitable for a high resolution probe.

The probe for a scanning probe microscope of the present invention has a structure where a columnar tip is grown by FTB-CVD on a base section formed by widely flattening an area of a tip section of a conventional silicon probe, so it is possible to make the strength of the probe, particularly a blade section, solid.

Also, by carrying out deposition so that the tip shape of the columnar tip becomes hemispherical, it is easy to compensate for lack of image clarity in a measured microscopic image, and also a contact condition with respect to the sample surface becomes surface contact and measurement reproducibility for conductivity etc. is made stable and high. It is also difficult to damage the surface of the sample and it is possible to apply pressure to the tip section.

The probe for a scanning probe microscope of the present invention has a columnar tip formed by FIB-CVD of a probe tip section, and so it is possible to achieve ideal conditions for vertically contacting a sample surface at the time of scanning simply by irradiating an ion beam with a sample stage tilted by an extent of angle of inclination of the cantilever.

The probe for a scanning probe microscope has a structure where a plurality of cylindrical tips of differing length are erected on the same cantilever, and in this way, even if a first probe is damaged it is possible to carry out measurement using a next probe. Also, by forming a plurality of cylindrical tips facing in different directions on the tip end of a probe and using the fact that angle and length with respect to a base tip are already known, it is possible to measure a side wall of a sample. Further, by making the cylindrical tip partially thin, and breaking it off at specified places, in cases such as where the tip section is disadvantageously transformed during measurement or, foreign bodies are attached, it is possible to consciously apply a load, break of the tip and use the next section as the tip section.

Also, a probe for a scanning probe microscope of the present invention, being a probe having a structure where tungsten or DLC is deposited around a narrow cylindrical CNT using the FIB-CVD technique of the present invention, compensation for drawbacks of an AFM probe using a CNT is achieved.

In a process of causing decomposition of organic gas on the tip of a probe using an ion beam inside a vacuum chamber of a focused ion beam device and using decomposed deposits to make a solid cylindrical probe, by carrying out growth under conditions where gas partial pressure of a probe section to be grown is kept constant and ion beam current density is kept constant, a method of manufacturing a probe for a scanning probe microscope of the present invention can manage probe length utilizing ion beam irradiation time.

Also, in a process of causing decomposition of organic gas on the tip of a probe using an ion beam inside a vacuum chamber of a focused ion beam device and using decomposed deposits to make a solid cylindrical probe, by detecting ion current flowing into a cantilever a method of manufacturing a probe for a scanning probe microscope of the present invention can determine whether conductivity of a conductive cantilever is good or bad utilizing the detected current value, for example, an integrated value of ion current flowing into the cantilever. It is therefore possible to perform adjustment after manufacture and to sort defective products even if continuity testing is not carried out.

A method of manufacturing a probe for a scanning probe microscope of the present invention can cause continuous growth of a cylinder of differing thickness by varying focusing conditions of a focused ion beam after causing decomposition of organic gas on the tip of a probe using an ion beam inside a vacuum chamber of a focused ion beam device and using decomposed deposits to make a solid cylindrical probe.

It is also possible to carry out microfabrication of a deposited cylindrical tip by varying focusing conditions of a focused ion beam and using sputtering after causing decomposition of organic gas on the tip of a probe using an ion beam inside a vacuum chamber of a focused ion beam device and using decomposed deposits to make a solid cylindrical probe.

What is claimed is:

1. A probe for a scanning probe microscope, comprising: a cantilever portion; and a microscopic probe portion comprising a solid columnar tip formed at a distal end "of the cantilever portion by deposition of a product of an organic gas which has been decomposed by a focused ion beam inside a vacuum chamber."

2. A probe for a scanning probe microscope according to claim 1; wherein the organic gas is a hydrocarbon gas, and the solid columnar tip is formed of a diamond-like carbon material.

3. A probe for a scanning probe microscope according to claim 1; wherein the organic gas is an organometallic gas, and the solid columnar tip is formed of metal.

4. A probe for a scanning probe microscope according to claim 1; wherein the organic gas is an organometallic gas, and the solid columnar tip is formed of a magnetic metal.

5. A probe for a scanning probe microscope according to claim 1; wherein the solid columnar tip comprises a carbon core formed using a hydrocarbon gas as the organic gas, and a metal layer covering the carbon core formed using a metallic gas as the organic gas.

6. A probe for a scanning probe microscope according to claim 1; wherein the organic gas is a hydrocarbon gas and an organometallic gas, and the solid columnar is formed of a mixed material of metal and carbon.

7. A probe for a scanning probe microscope according to claim 1; wherein the cantilever portion is formed of silicon or silicon nitride coated with a conductive metal.

8. A probe for a scanning probe microscope according to claim 7; wherein the columnar tip is coated with the conductive metal.

9. A probe for a scanning probe microscope according to claim 1; wherein the cantilever portion has a flattened tip portion formed of a material containing silicon, and the solid columnar tip is formed on the flattened tip portion.

10. A probe for a scanning probe microscope according to claim 1; wherein the shape of a point of the solid columnar tip is hemispherical.

11. A probe for a scanning probe microscope according to claim 1; wherein the solid columnar tip extends from the cantilever portion at an angle shifted by an angle at which the cantilever portion is inclined during scanning of the probe portion across a sample surface, so that the columnar tip is perpendicular to the sample surface during the scanning.

12. A probe for a scanning probe microscope according to claim 1; wherein the cantilever portion has a flattened tip portion formed parallel to a measurement sample surface, and the columnar tip is formed on the flattened tip portion.

13. A probe for a scanning probe microscope according to claim 1; wherein the columnar tip comprises a plurality of columnar tips of differing length formed at the distal end of the cantilever portion, such that even if one of the columnar tips is damaged during use, it is possible to carry out measurement using another columnar tip.

14. A probe for a scanning probe microscope according to claim 1; wherein the columnar tip comprises a plurality of columnar tips extending from the cantilever portion in different directions to enable measurement of a side wall of a sample based upon a known length and angle of orientation of the respective columnar tips.

15. A probe for a scanning probe microscope according to claim 1; wherein the columnar tip has a bell-shaped end portion to enable measurement of a side wall of a sample based upon known dimensions of the bell-shaped end portion.

16. A probe for a scanning probe microscope according to claim 1; wherein a thickness of the columnar tip is formed to have at least one reduced-thickness portion so as to be selectively breakable at the reduced-thickness portion.

17. A probe for a scanning probe microscope according to claim 1; wherein the cantilever portion has a cylindrical carbon nanotube provided therein, and the columnar tip is formed by decomposing the organic gas around the carbon nanotube to increase rigidity of the carbon nanotube.

18. A method of manufacturing a probe for a scanning probe microscope, comprising the steps of:

providing a cantilever portion in a vacuum chamber of a focused ion beam device;

decomposing an organic gas in the vacuum chamber using a focused ion beam of the focused ion beam device;

forming a solid columnar tip at a distal end of the cantilever portion by depositing the decomposed organic gas; and controlling a length of the columnar tip by maintaining constant a current density of the focused ion beam and a partial pressure of the organic gas in a vicinity of the columnar tip.

19. A method of manufacturing a probe for a scanning probe microscope, comprising the steps of:

providing a cantilever portion in a vacuum chamber of a focused ion beam device;

decomposing an organic gas in the vacuum chamber using a focused ion beam of the focused ion beam device;

forming a solid columnar tip at a distal end of the cantilever portion by depositing the decomposed organic gas; and detecting a level of an ion current flowing in the probe to determine whether a conductivity of the probe is sufficient.

20. A method of manufacturing a probe for a scanning probe microscope according to claim 19; wherein the step of detecting a level of an ion current comprises the step of detecting an accumulated value of an ion current amount flowing in the probe during the manufacture thereof.

21. A method of manufacturing a probe for a scanning probe microscope, comprising the steps of:

providing a cantilever portion in a vacuum chamber of a focused ion beam device;

decomposing an organic gas in the vacuum chamber using a focused ion beam of the focused ion beam device;

forming a columnar tip at a distal end of the cantilever portion by depositing the decomposed organic gas; and changing a focusing state of the focused ion beam to cause a cylinder having a continuously varying thickness to be deposited from the decomposed organic gas.

22. A method of manufacturing a probe for a scanning probe microscope, comprising the steps of:

providing a cantilever portion in a vacuum chamber of a focused ion beam device;

decomposing an organic gas in the vacuum chamber using a focused ion beam of the focused ion beam device;

forming a columnar tip at a distal end of the cantilever portion by depositing the decomposed organic gas; and changing a focusing state of the focused ion beam by stopping the organic gas from being injected into the vacuum chamber to thereby etch the deposited columnar tip by a sputtering operation.

* * * * *